Sept. 23, 1952        H. T. HORNER        2,611,351
ENGINE CONTROL FOR MODEL AIRPLANES
Filed April 27, 1949             3 Sheets-Sheet 1
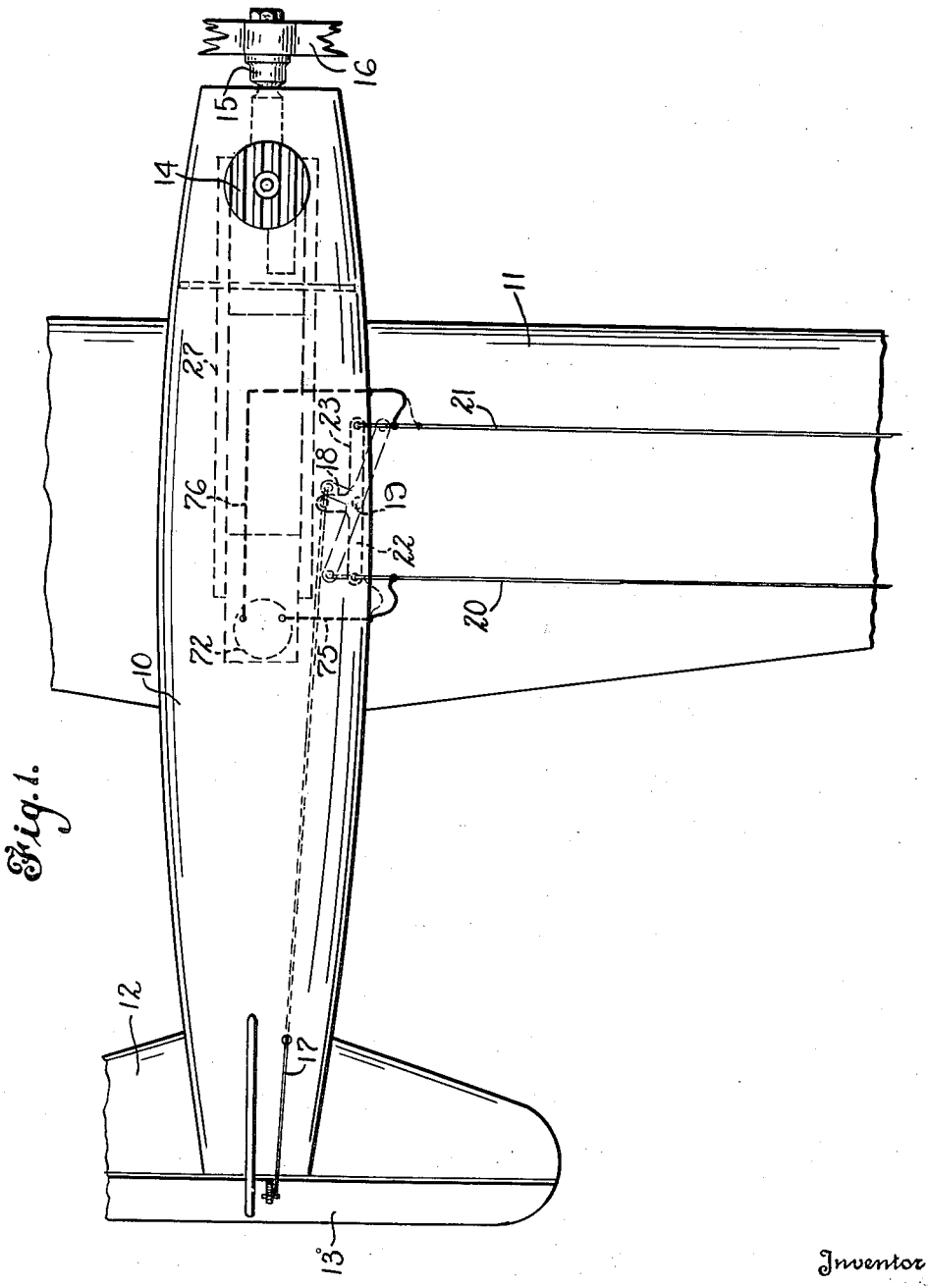
Inventor
Harold T. Horner
By
Rockwell v Bartholow
ATTORNEYS Sept. 23, 1952     H. T. HORNER     2,611,351
ENGINE CONTROL FOR MODEL AIRPLANES
Filed April 27, 1949     3 Sheets-Sheet 2
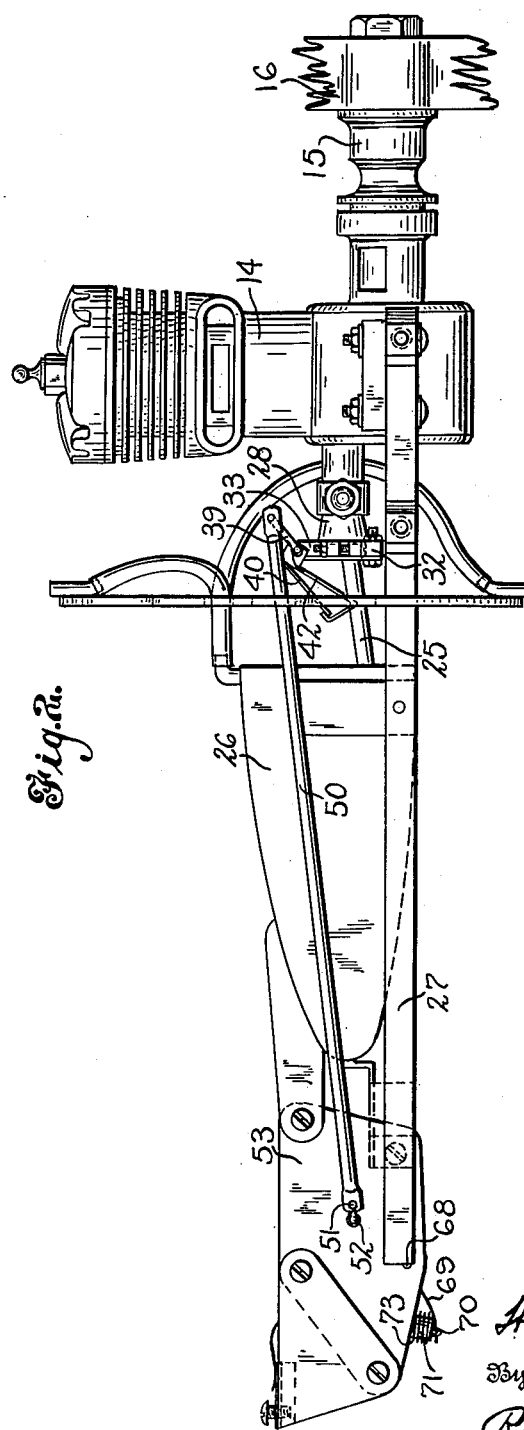
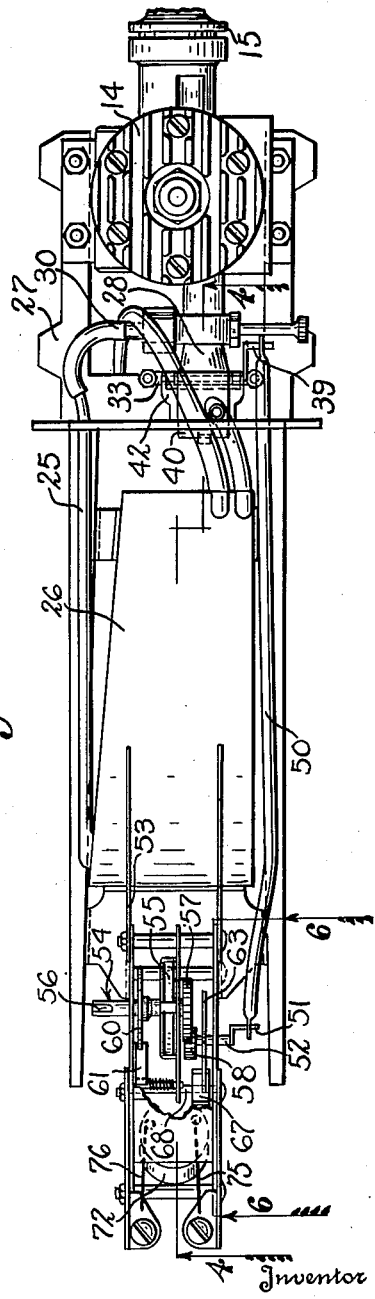

Sept. 23, 1952  H. T. HORNER  2,611,351
ENGINE CONTROL FOR MODEL AIRPLANES
Filed April 27, 1949  3 Sheets-Sheet 3
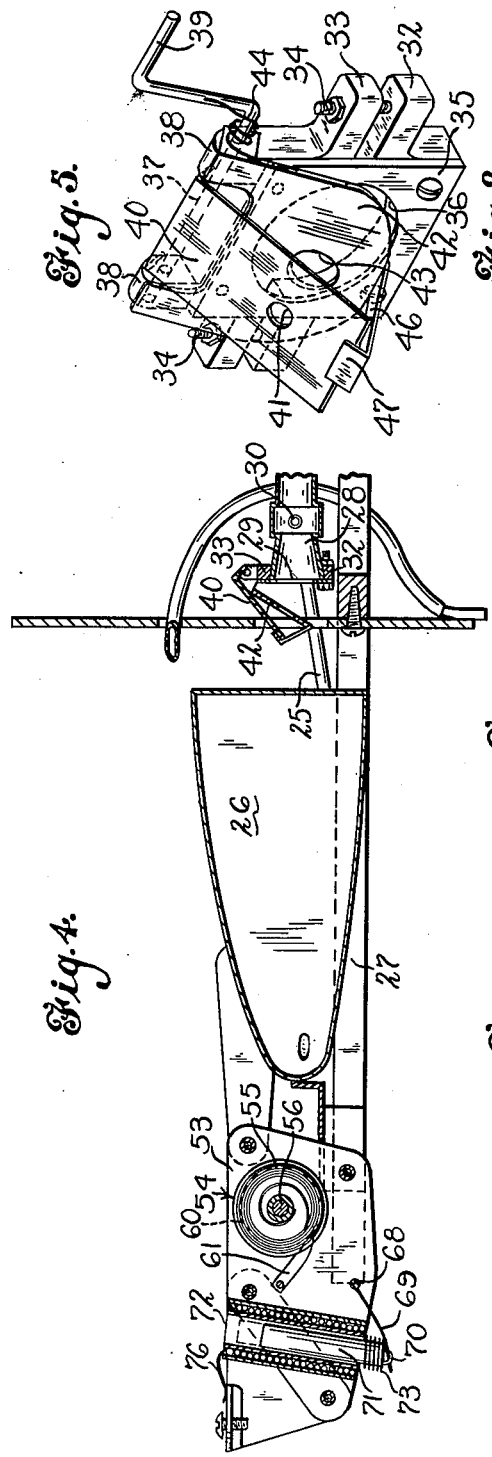
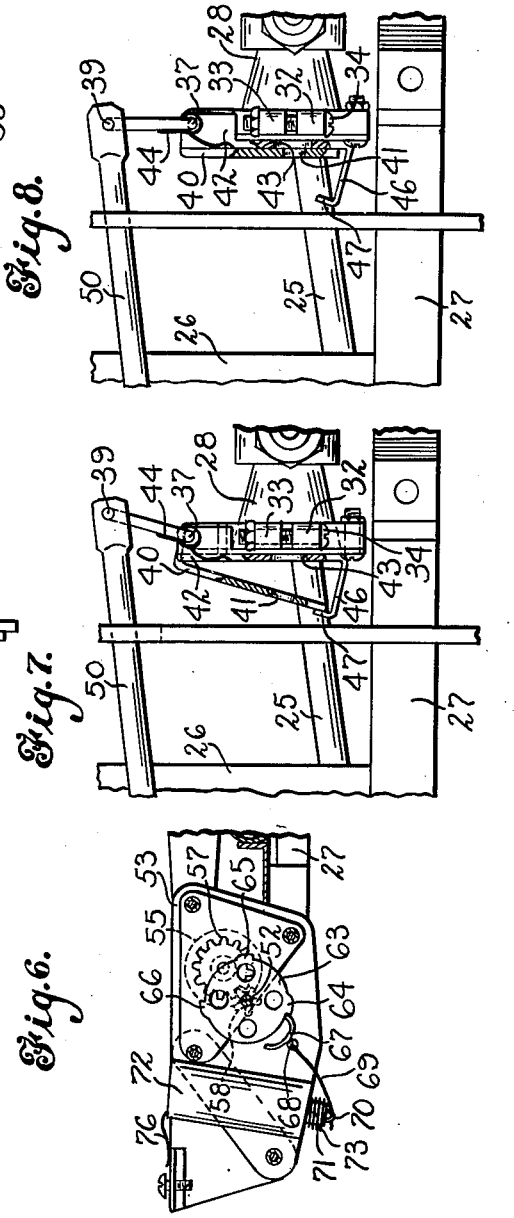
Inventor
Harold T. Horner
By
Rockwell & Nicholas
ATTORNEYS Patented Sept. 23, 1952

2,611,351

UNITED STATES PATENT OFFICE 2,611,351

ENGINE CONTROL FOR MODEL AIRPLANES

Harold T. Horner, Milford, Conn.

Application April 27, 1949, Serial No. 89,946

18 Claims. (Cl. 123—97)

This invention relates to a motor control for model airplanes, and more particularly to mechanism by which the speed of a motor of a model airplane may be controlled by the operator of the plane through the lines by which the plane is held captive.

In flying model airplanes, it is customary for the plane to be powered by a small internal combustion motor and in operating such planes they are usually held captive by the operator by means of lines which are attached to the planes. These lines usually are connected to the elevator of the plane so that its flight can be controlled from the ground, to a considerable extent.

While this permits control of the flight of the plane so far as it determines whether the plane is ascending or descending, it does not control the speed at which the plane flies. I contemplate by the present invention the provision of means for permitting the operator to vary the speed of the motor and thereby the speed of the plane as well as controlling the elevation at which the plane flies.

In the embodiment of my invention illustrated, I effect this result by controlling the admission of air to the motor so that more or less air will be mixed with the supply of fuel. The arrangement is such that when the air-intake passage is fully opened, the motor will operate at its maximum speed, and when the effective size of the air-intake opening is reduced, the motor will operate at a reduced speed, the speed depending upon the effective decrease in size of the intake opening.

While variations in this respect may be resorted to without departing from the invention, I have illustrated a control by which the motor may be operated at three different speeds, namely, full speed when the air-intake is fully opened; one-half speed when the air-intake opening is partially closed; and idling speed when the air-intake opening is closed to a further extent. If desired, of course, other intermediate speeds could be obtained.

In order that change of speed may be effected by the operator on the ground, I have arranged for the valves or shutters which control the air-intake opening of the motor to be operated by a clockwork mounted on the model airplane, the clockwork in turn to be controlled by electrical means, such as a solenoid, which solenoid is energized by means of batteries carried by the operator. The wires which carry the current to the solenoid may also serve as the lines by which the plane is held captive and by which the height of the flight is controlled.

One object of this invention is to provide a new and improved mechanism for controlling the motor of a model airplane.

A further object of the invention is to provide a new and improved mechanism by which the speed of a motor of a model airplane can be electrically controlled by the operator on the ground.

A still further object of the invention is to provide a means for controlling the air intake of the motor of a model airplane so as to control the speed of the motor, the air intake being provided with valves or shutters to reduce the effective size thereof in varying degrees so as to effect variations in the speed of the motor.

A still further object of the invention is to provide a device of the character described in which the valves controlling the effective size of the air intake of a motor of a model airplane are electrically controlled by means carried upon the plane, and wherein the supply of current to the electrical means is controlled by the operator on the ground.

To these and other ends the invention consists in the novel features and combinations of parts to be hereinafter described and claimed.

In the accompanying drawings:

Fig. 1 is a partial top plan view of a model airplane embodying my invention;

Fig. 2 is a side elevational view of the internal combustion motor of the plane provided with my control mechanism;

Fig. 3 is a top plan view of the parts shown in Fig. 2;

Fig. 4 is a sectional view on line 4—4 of Fig. 3;

Fig. 5 is a perspective view of the valve mechanism controlling the air intake of the motor;

Fig. 6 is a sectional view on line 6—6 of Fig. 3;

Fig. 7 is a fragmentary side elevational view of the air intake of the motor showing the position of the valves when set for operation of the motor at one-half speed; and Fig. 8 is a view similar to Fig. 7 showing the position of the valves when set for the operation of the motor at idling speed.

In Fig. 1 of the drawings, I have shown in a conventional way a model airplane comprising a fuselage 10, wings 11, a tail 12, and an elevator 13. At the forward portion of the fuselage is mounted an internal combustion motor 14 which in this instance is a two-cycle internal combustion engine, which engine drives the propeller shaft 15, which carries the propeller 16. A control line 17 leads from the elevator to one arm 18 of a control lever pivoted to the body of the plane at 19. Lines 20 and 21 are connected to the arms 22 and 23 of this lever so that, as will be understood by those skilled in the art, this control lever may be swung about its pivot 19 by the operator of the plane on the ground to actuate the elevator 13 and control the height of the flight of the plane. It will be understood that in this instance the lines 20 and 21 will carry conducting wires so that current from a battery carried by the operator may be supplied through these wires to a solenoid on the plane, as will be hereinafter described.

Referring more especially to Figs. 2, 4 and 5 of the drawings, fuel is supplied to the motor 14 through a pipe 25 leading from the rear end of the fuel tank 26 mounted upon the rear portion of a frame designated generally by the numeral 27, which frame also supports the motor. Air is supplied to the motor through the intake pipe 28, the rear end of this pipe being open as shown at 29 in Fig. 4. The fuel pipe 25 also leads into the air intake 28 at the point 30 forwardly of the rear open end of the intake.

In order to variably control the effective size of the opening 29 of the air intake, I provide a valve device shown more especially in Fig. 5. This device comprises a clamp consisting of two parts 32 and 33 designed to embrace the air tube 28 and be secured tightly thereon by screws 34. A valve seat member 35, having an opening 36, is secured to the rear face of the clamp, the opening 36 registering with the opening 29 of the air-intake tube 28.

A pivot pin 37 is rotatably mounted in ears 38 provided upon the clamp member 33, this pivot pin being provided with a crank arm 39.

Secured to the pivot pin 37 is an outer valve member 40 having a relatively small opening 41 therein. Rotatably mounted upon the pin 37 is a second valve member 42 having an opening 43 therein, which opening is of larger size than the opening 41, but of smaller size than the opening 29. The valve member 42 lies between the valve 40 and the member 35. A spring 44 surrounds the pivot pin 37 and one end of this spring is secured to the crank member, while the other end acts upon the valve member 42 and tends to urge it toward the member 35, or toward closed position. The movement of the valve member 42, however, relatively to the valve member 40 is limited by the stop member 46 secured to the valve member 42 and provided with an upwardly turned end 47 which engages the valve member 40.

With this construction it will be seen that when the valve member 40 is held in its wide open position, as shown in Fig. 5, the spring 44 tends to seat the valve member 42 against the member 35, but this movement is prevented by the stop 47 so that both valves are in wide open position with respect to the opening 29, as shown in Fig. 4. If, however, the crank 39 be given a slight turn in a counter-clockwise direction, the valve 40 will be moved toward the opening 29 and this will permit the valve member 42 to seat against the plate member 35 and thus restrict the effective size of the intake opening to the size of the opening 43. This position of the parts is shown in Fig. 7 of the drawings where, as will be seen, the outer valve plate 40 stands in open position, but the inner valve plate 42 is seated against the member 35. This is the one-half speed position of the parts. If the crank 39 be given a further movement in a counter-clockwise direction to the position shown in Fig. 8, the outer valve 40 will be moved against the valve 42 and thus the effective size of the intake opening 29 will be reduced to the size of the small opening 41 in the plate 40 and the motor will operate at idling speed.

A link or pitman 50 connects the crank 39 with a crank 51 provided upon a shaft 52 mounted in a frame member 53 of a spring motor designated generally by the numeral 54. This mechanism comprises a spring 55 and a winding shaft 56 to which one end of the spring is connected. The other end of the spring is connected to the shaft of a gear 57 which meshes with a gear 58 secured to the shaft 52, so that, when the gear 57 turns, the shaft 52 will also be rotated to rotate the crank 51. A ratchet wheel 60 is provided on the winding shaft 56 and its teeth are engaged by a pawl 61 to prevent the unwinding of the spring.

Referring more particularly to Fig. 6, an escapement wheel 63 is secured to the shaft 52, this escapement wheel having three teeth 64, 65 and 66. Cooperating with the teeth of the escapement wheel is a rocking pallet 67 mounted upon a shaft 68 pivoted in the frame and extending transversely across the frame. One end of a wire 69 is secured to this crank and the other end passes loosely through an eye 70 secured to the plunger 71 of a solenoid 72. A spring 73 normally holds the plunger 71 in its lower position, shown in Figs. 4 and 6, and when the solenoid is energized the plunger will be raised, thus rocking the shaft 68 and the pallet 67 secured to this shaft. As shown in Fig. 1, conducting wires 75 and 76 lead from the solenoid to the lead-in wires 20 and 21.

It will be understood that the lead-in wires are connected at their ends with a battery which may be carried in the pocket of the operator, the current from the battery to the wires 20 and 21 being controlled by a switch (not shown) so that the operator may energize the solenoid at will.

The operation of the device is as follows. When the motor is operated at full speed, the parts will be in the position shown in Figs. 2 and 4 and it will be observed that both of the valves 40 and 42 stand outwardly from the member 35 so that the air-intake opening is not restricted. If it is desired to throttle the motor down to its half-speed position, the operator actuates the switch to energize the solenoid 72. This rocks the pallet 67 and permits the escapement wheel 63 to rotate through the distance of one tooth space, this partial rotation being completed when the switch is released, the coil of the solenoid de-energized, and the plunger returns to its normal position under the impulse of the spring 73, so that the detent of the pallet will engage behind the next succeeding tooth on the escapement wheel. This will move the valves to the position shown in Fig. 7 where the valve member 42 will rest against the plate member 35, thus restricting the effective size of the air opening to the size of the opening 43 in the valve member 42, which will be half-speed position.

The turning of the escapement wheel permits partial rotation of the crank 51 and this effects a slight movement of the crank 39 through the pitman 50. This movement of the crank 39 permits the valve member 40 to move toward the plate member 35, allowing the spring 44, which urges the valve members apart, to close the valve 42.

If now it is desired to throttle the motor down to idling speed, the solenoid is again energized, thus rocking the pallet 67 and permitting the escapement wheel to move through the distance of another tooth space, thus again rocking the crank 39 through a further arc in a counter-clockwise direction, as shown in Fig. 2. This serves to close the valve member 40 against the valve member 42, as shown in Fig. 8, against the tension of the spring 44 and restricts the effective size of the air-intake opening to that of the small opening 41.

If full speed of the motor is again desired, the operator again energizes the solenoid 72 permitting the escapement wheel and crank 51 a further rotation. As the crank 51 was in a dead-center position with respect to the pitman 50, this rotation serves to rock the crank 39 in the opposite direction or in a clockwise direction, as shown in Fig. 2, thus restoring the parts to their original positions, shown in Figs. 2 and 4, in which the air intake is fully open. It will be seen, therefore, that the connections are such that, while the crank 51 makes a complete step-by-step rotation, the crank 39 is oscillated and not given a complete rotation. The oscillation of this crank in a counter-clockwise direction is effected in two steps as illustrated, while its return movement is effected in a single step. Variations in the number of positions of the crank 39 may be arranged by variation in the number of teeth on the escapement wheel, so that a greater number of different speeds of the motor may be effected, if desired.

While I have shown and described a preferred embodiment of my invention, it will be understood that it is not to be limited to all of the details shown, but is capable of modification and variation within the spirit of the invention and within the scope of the claims.

What I claim is:

1. A speed-control device for the motor of a model airplane comprising valve means, a rockable arm connected to said means to actuate the same, a rotatable crank member for moving said arm in opposite directions and means for rotating said crank member and constraining its rotation to a step-by-step movement.

2. A speed control device for the motor of a model airplane comprising valve means, a rockable arm connected to said means to actuate the same, means for moving said arm in opposite directions, a stop member mounted for movement into and out of the path of said moving means, and electrically controlled means for actuating said stop member.

3. A speed-control device for the motor of a model airplane comprising valve means, a rockable arm connected to said means to actuate the same, and means for rocking said arm, said means moving the arm in one direction in a step-by-step movement and moving the arm in the other direction through its full range of movement in one step.

4. A speed-control device for the motor of a model airplane comprising valve means, a rockable arm connected to said means to actuate the same, a rotatable member connected to said arm for moving said arm in opposite directions, means for rotating said crank member and electrical means for constraining the rotation of said member to a step-by-step movement.

5. A speed-control device for the motor of a model airplane comprising valve means, a rockable arm connected to said means to actuate the same, a rotatable member connected to said arm for moving said arm in opposite directions, means for rotating said member, and a solenoid for constraining the rotation of said member to a step-by-step movement.

6. A speed-control device for the motor of a model airplane comprising a rockable throttle member, a crank connected to said member to oscillate the same, and means to rotate said crank in one direction in a step-by-step movement to rock said throttle member in opposite directions.

7. A speed-control device for the motor of a model airplane comprising a rockable throttle member, a crank, means to rotate said crank in a step-by-step movement, and means connecting said crank to said throttle member to move the latter in a step-by-step movement in one direction and to move it in the other direction throughout the full range of its movement in one step.

8. A speed control device for the motor of a model airplane comprising a rockable throttle member, a rotatably mounted element connected to said member to oscillate the same, a stop movable into and out of the path of a part of said rotatably mounted element, and electrically controlled means to actuate said stop member.

9. A speed-control device for the motor of a model airplane comprising a rockable throttle member, a crank connected to said member to oscillate the same, means to rotate said crank, an electrically-operated means to limit said rotation to less than a complete revolution in one step.

10. A speed-control device for the motor of a model airplane comprising a rockable throttle member, a crank connected to said member to oscillate the same, means to rotate said crank, and electrically-operated means to control said rotation, said last-named means comprising an escapement mechanism and a solenoid to control said mechanism.

11. A speed-control device for the motor of a model airplane comprising a rockable throttle member, a crank, a pitman connecting said crank to the throttle member, a spring motor to rotate the crank, and electrically-operated means to control the rotation of the crank in a step-by-step movement.

12. A speed-control device for the motor of a model airplane comprising a rockable throttle member, a crank, a pitman connecting said crank to the throttle member, a spring motor to rotate the crank, electrically-operated means to control the rotation of the crank in a step-by-step movement, said last-named means comprising an escapement wheel secured to said crank, a pallet cooperating with said wheel, and a solenoid to actuate said pallet.

13. A device for controlling the speed of the internal combustion motor of a toy airplane, the motor having an air-intake port, said device comprising valve means cooperating with said port, a rockable arm on which said valve means is carried, means for rocking said arm in both directions, electrical means for limiting the amount of rocking movement of said arm, and a manually operable switch for energizing said last-named means.

14. A device for controlling the speed of the internal combustion motor of a toy airplane, the motor having an air-intake port, said device comprising a pair of valve members, means coincidentally hinging said valve members in cooperative relation to said port, and electrically-controlled means for operating one of said valve members independently of the other.

15. A device for controlling the speed of the internal combustion motor of a toy airplane, the motor having an air-intake port, said device comprising a pair of valve members, means coincidently hinging said valve members in cooperative relation to said port, and electrically-controlled means for moving said members toward and from said port.

16. A device for controlling the speed of the internal combustion motor of a toy airplane, the motor having an air-intake port, said device comprising a pair of valve members, means hinging said valve members in cooperative relation to said port, each of said members having an opening therein to register with said port and one of said openings being larger than the other, and electrically-controlled means for actuating said valve members.

17. A device for controlling the speed of the internal combustion motor of a toy airplane, the motor having an air-intake port, said device comprising a pair of valve members, each of said members being of plate-like form with an opening therein, a rockable arm to which one of said members is secured in cooperative relation to said port, the other of said members being hingedly mounted on said arm, spring means urging said valve members apart, and electrically-controlled means to oscillate said arm.

18. A device for controlling the speed of the internal combustion motor of a toy airplane, the motor having an air-intake port, said device comprising a pair of valve members, each of said members being of plate-like form with an opening therein, a rockable arm to which one of said members is secured in cooperative relation to said port, the other of said members being hingedly mounted on said arm, spring means urging said valve members apart, and electrically-controlled means to oscillate said arm in a step-by-step movement to move said members individually to reduce the effective area of said port.

HAROLD T. HORNER.

REFERENCES CITED

The following references are of record in the file of this patent:

UNITED STATES PATENTS

| Number | Name | Date |
|---|---|---|
| 1,304,987 | Kemp | May 27, 1919 |
| 1,843,960 | Sticelber | Feb. 9, 1932 |
| 2,259,656 | Neumann | Oct. 21, 1941 |
| 2,292,416 | Walker | Aug. 11, 1942 |
| 2,439,054 | Mosthof | Apr. 6, 1948 |
| 2,442,149 | Ruth et al. | May 25, 1948 |